United States Patent [19]

Aiken

[11] Patent Number: 4,462,157
[45] Date of Patent: Jul. 31, 1984

[54] SNIPS AND SHEARS

[75] Inventor: John M. Aiken, Hastings, Nebr.

[73] Assignee: The Stanley Works, New Britain, Conn.

[21] Appl. No.: 292,954

[22] Filed: Aug. 14, 1981

[51] Int. Cl.³ .............................................. B26B 13/06
[52] U.S. Cl. ......................................... 30/259; 30/224
[58] Field of Search ................. 30/198, 193, 222, 224, 30/225, 234–236, 223, 267–269, 257, 254, 259

[56] References Cited

U.S. PATENT DOCUMENTS

| | | |
|---|---|---|
| 137,894 | 4/1873 | Cotton . |
| 701,530 | 6/1902 | Alger . |
| 766,298 | 8/1904 | Voellner et al. . |
| 837,997 | 12/1906 | Zeller . |
| 942,043 | 11/1909 | Searight . |
| 985,048 | 2/1911 | Meissner . |
| 1,284,688 | 11/1918 | Hultman . |
| 1,436,603 | 11/1922 | Philbert . |
| 1,594,671 | 8/1926 | Isaac ........................................ 30/259 |
| 1,632,284 | 6/1927 | Gardiner . |
| 2,033,216 | 3/1936 | Whyte ................................ 30/268 X |
| 2,078,585 | 4/1937 | Rauh . |
| 2,163,088 | 6/1939 | Grant . |
| 2,264,840 | 12/1941 | Isaac . |
| 2,307,457 | 1/1943 | Franko . |
| 2,604,695 | 7/1952 | McGary et al. . |
| 2,766,526 | 10/1956 | Pape . |
| 2,775,033 | 12/1956 | Wilson . |
| 2,869,235 | 1/1959 | Klenk . |
| 2,931,100 | 4/1960 | Wertepny . |
| 3,090,121 | 5/1963 | Chonka . |
| 3,579,828 | 5/1971 | Hexdall . |
| 3,587,173 | 6/1971 | Hexdall . |
| 3,740,846 | 6/1973 | Duffy ....................................... 30/267 |

FOREIGN PATENT DOCUMENTS 588530 5/1947 United Kingdom .

OTHER PUBLICATIONS

Aiken et al., Ser. No. 188,088 Filed 09171980.

Primary Examiner—E. R. Kazenske
Assistant Examiner—Douglas D. Watts

[57] ABSTRACT

An improved heavy duty snips and shears useful for cutting sheet metal or other stiff or rigid material. The improved snips and shears include a lower blade having a substantially horizontally disposed body. The body of the lower blade comprises a first horizontal section, an intermediate downwardly inclined section, and a second horizontally disposed section. The inner edge of the intermediate section forms a cutting edge which is turned upwardly such that the cutting edge is raised above the first and second horizontal sections. The upper blade of the snips and shears is pivotally attached to the lower blade and includes a downwardly extending heel disposed at the rearward end of the cutting edge. A machine ground boss is formed on one of the blades and provides a friction surface which provides a pressure point of minimum area to facilitate sliding contact of the two blades.

33 Claims, 10 Drawing Figures

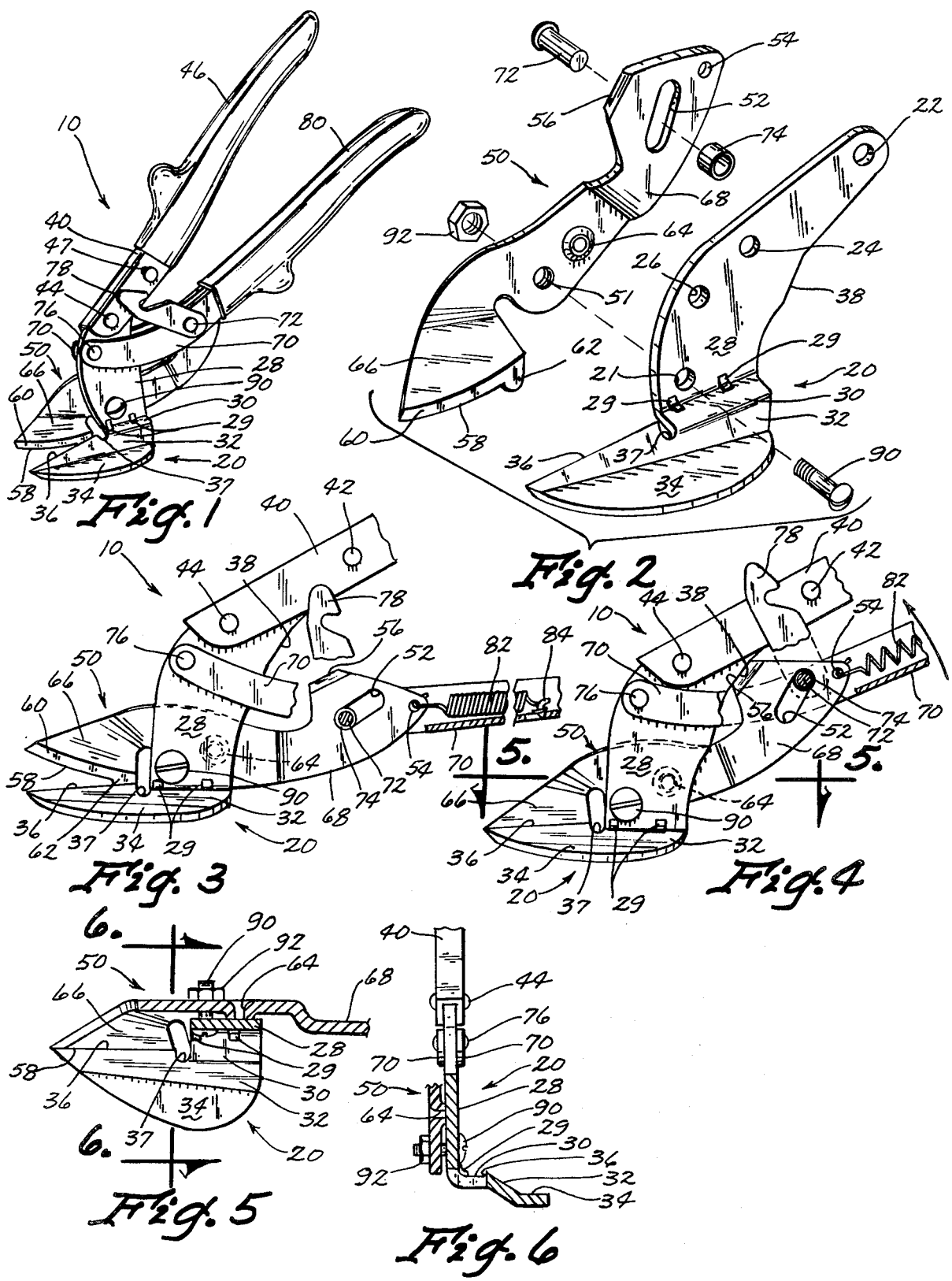

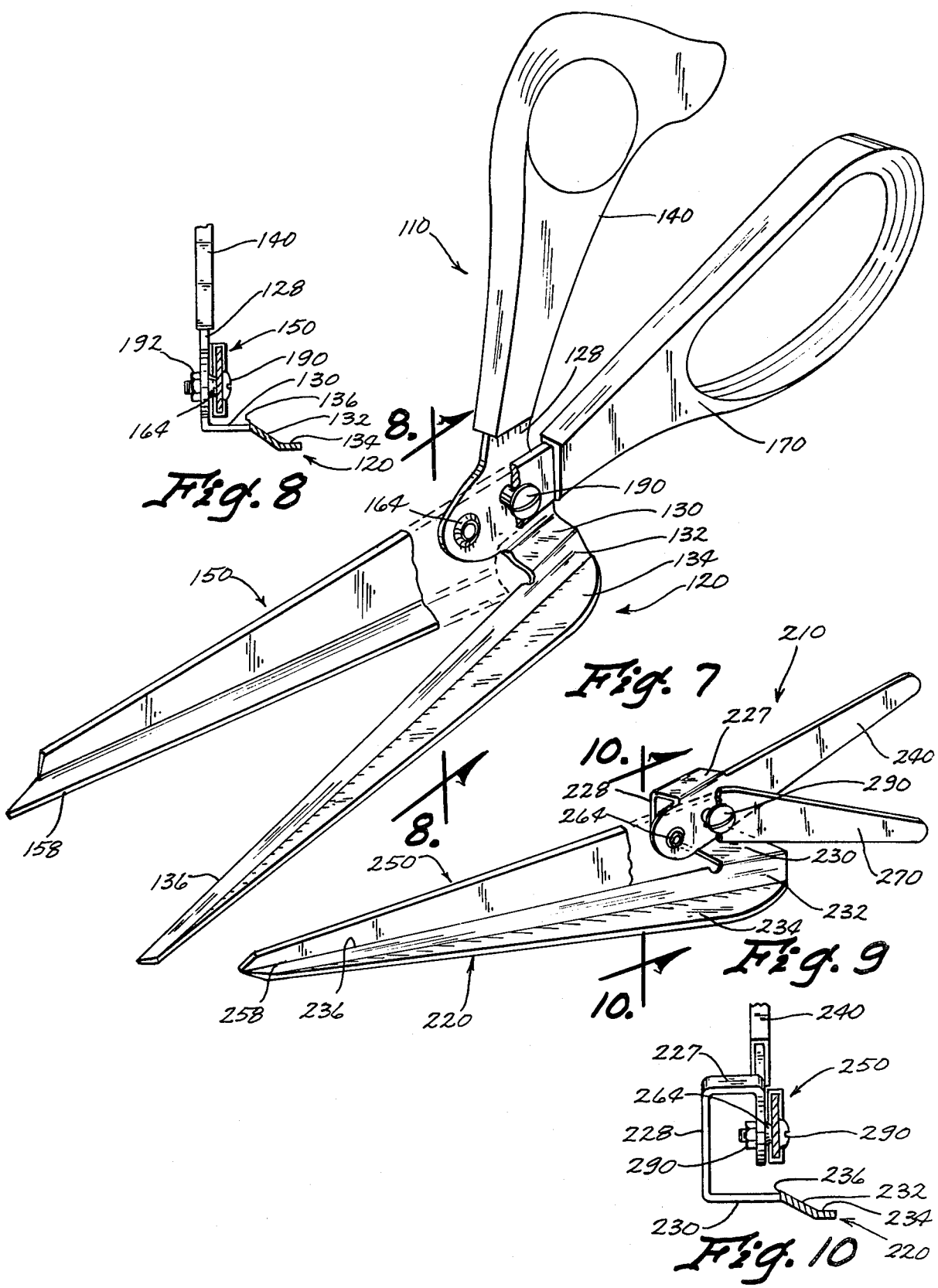

SNIPS AND SHEARS

BACKGROUND OF THE INVENTION

The present invention relates generally to cutting tools and more particularly to snips and shears useful for cutting sheet metal or other stiff or rigid material.

One of the problems associated with conventional snips and shears is that the material being cut interfers with the movement of the blades or handles. To solve this problem, offset snips and shears have been provided which include a lower blade having a horizontally disposed body depending from a relatively narrow vertical neck. The cutting edge of this lower blade has been offset with respect to the vertical neck to allow cutting straight or in a curved path to the right or to the left. Problems, however, still remain, such as limited strength of the lower blade; frictional drag of the material passing over and under the lower blade, and over the land of the upper blade; frictional drag of the contacting surfaces of the blades remote from the cutting edges; and frictional drag in the sliding connection between the upper blade and its attached handle.

Those concerned with these and other problems recognize the need for an improved snips and shears.

SUMMARY OF THE INVENTION

The snips and shears of the present invention provide for maximum strength of the lower blade by use of the stepped design of the blade; provide for minimum frictional drag resulting from contact of the material being cut by use of the raised cutting edge of the lower blade and the downwardly depending heel of the upper blade; provide for minimum frictional drag resulting from contact of the blade surfaces by use of the friction surface having a limited surface area; and provide for minimum frictional drag of the sliding connection between the upper blade and its handle by use of a sleeve bearing over the connecting rivet.

An object of the present invention is the provision of an improved snips and shears.

Another object of the present invention is to provide snips and shears that are durable and easy to use.

Yet another object of the invention is to provide snips and shears that are efficiently designed and inexpensive to manufacture.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of the improved snips of this invention, showing the snip blades in the spring-biased open position;

FIG. 2 is an exploded perspective view of the snip blades, illustrating the threaded pivotal connection of the blades and the sleeve bearing on the rivet connecting the upper blade to its handle;

FIG. 3 is a side elevational view having portions cut-away to show the position of the connecting rivet in the slot of the upper blade when the blades are biased to the open position, and showing the ground coined boss friction surface in dashed lines;

FIG. 4 is a side elevational view similar to FIG. 3, but showing the blades in the closed position;

FIG. 5 is a sectional view taken along line 5—5 of FIG. 4;

FIG. 6 is a sectional view taken along line 6—6 of FIG. 5, showing the cutting edge of the lower blade raised above the horizontal sections of the lower blade;

FIG. 7 is a perspective view of the improved shears of this invention, having portions cut-away to show the coined boss friction surface;

FIG. 8 is a sectional view taken along line 8—8 of FIG. 7, showing the cutting edge of the lower blade raised above the horizontal sections of the lower blade;

FIG. 9 is a perspective view of another embodiment of the improved shears of this invention, having portions cut-away to show the friction surface; and FIG. 10 is a sectional view taken along line 10—10 of FIG. 9, showing the cutting edge of the lower blade raised above the horizontal sections of the lower blade.

DESCRIPTION OF THE PREFERRED EMBODIMENTS

Referring now to the drawings wherein like reference numerals designate identical or corresponding parts throughout the several views, FIG. 1 illustrates the improved snips of this invention generally designated by reference numeral 10. The snips 10 include a lower blade structure 20 pivotally connected to an upper blade structure 50 by bolt 90. Bolt 90 extends through opening 21 of lower blade 20 and threaded opening 51 of upper blade 50 and is secured by nut 92 (FIG. 2). A first handle 40 is attached to lower blade 20 by rivets 42 and 44 which extend through openings 22 and 24 of the lower blade 20 (FIG. 2). The major portion of first handle 40 is covered by a polymer-type grip 46.

A second handle 70 is attached to upper blade 50 by rivet 72 which extends through the elongated slot 52 of the upper blade 50 (FIG. 2). The shaft of rivet 72 is inserted into sleeve bearing 74 and the sleeve bearing 74 engages the interior of elongated slot 52 (FIG. 2). The bifurcated forward end of handle 70 is pivotally attached to the lower blade 20 by rivet 76 which extends through opening 26 of lower blade 20. The rivet 76 is positioned near the forward end of first handle 40 to maximize the distance of rivet 76 from bolt 90, thus maximizing the available leverage. A notched tab 78 is pivotally attached to rivet 72 and disposed such that the notch will engage the extended end of rivet 42 when the snips 10 are in the closed position. A grip 80 covers the major portion of handle 70. Helical spring 82 is fastened into opening 54 of upper blade 50. The opposite end of spring 82 is attached to an extruded hook 84 which forms a part of the second handle 70. Spring 82 biases the upper blade 50 toward second handle 70, thus biasing snips 10 to the open position as shown in FIG. 3.

As shown most clearly in FIG. 2, the lower blade 20 includes a vertically disposed support neck 28 which is relatively narrow at the base. The narrow base of neck 28 together with the offset of the first cutting blade 36 allows for cutting in either direction. A first horizontal section 30 extends outward from the base of neck 28 and gussets 29 are disposed at the junction of neck 28 and the first horizontal section 30. A downwardly inclined intermediate section 32 extends outward from the first horizontal section 30 and a second horizontal section 34 extends outward from the intermediate section 32. The stepped design of sections 30, 32 and 34 together with the gussets 29 provide increased strength for the lower blade 20, while at the same time maintaining a relatively horizontal blade that will not interfer with objects located immediately below the material to be cut. While the drawings illustrate that the intermediate section is sloping downward at approximately thirty degrees (30°), it is to be understood that the downward slope could range from approximately fifteen to forty-five degrees (15°-45°).

Referring now to FIGS. 2 and 6, the inner edge of the intermediate section 32 forms a first cutting edge 36 which is offset with respect to neck 28 and extends above the first horizontal section 30. Although it could be otherwise formed, the raised cutting edge 36 is accomplished by the bend of the intermediate section 32 at the base of notch 37. The raised cutting edge is important since it acts to raise the material being cut above the first horizontal portion 30 and reduces the frictional drag. The stepped design also aids in this objective. It is also significant that the raised cutting edge 36 raises the material being cut so that it is closer to the pivot bolt 90, therefore increasing the leverage of the operator.

The lower blade 20 also includes a straight flat anvil surface 38 which mates with the ground chisel edge 56 of upper blade 50 when the snips are in the closed position (FIG. 4). Wire to be cut is inserted between handles 40 and 70 and the handles are closed to cut the wire.

Referring now to FIG. 2, the upper blade 50 includes a curved second cutting edge 58 formed at the bottom of a relatively narrow land surface 60. The curved cutting edge 58 results in greater force being executed, especially at the forward tip of the blades. The narrow land 60 allows the cut material to slide up over the top of the land 60 ahead of the cut so that a tighter radius can be maintained. This feature takes on increasing importance as the thickness of the material being cut increases.

A downwardly depending heel 62 is disposed at the rearward end of curved cutting edge 58. As most clearly illustrated in FIG. 3, the heel 62 allows more effective use of the entire curved cutting edge 58, especially in the situation where the material to be cut is positioned at the rearward end of the curved cutting edge 58 where the cutting force is the greatest. The heel 62 prevents the upper blade 50 from riding over on top of the lower blade 20 and also acts to push the newly cut material down so it will pass under the lower blade 20 with a minimum of frictional drag.

The upper blade 50 also includes a raised friction surface 64 which is precision ground to provide a pressure point of limited area to oppose the pressure exerted by the tendency of the upper and lower blades to be forced laterally apart as material is being cut. Although the friction surface 64 is illustrated as being circular in configuration, it is to be understood that it could be any of numerous configurations so long as the total surface area is limited. Conventional snips not using a raised friction surface have a large contact area between the blades which causes high frictional drag. The raised friction surface 64 is positioned so that the straight line formed by the mating of the cutting edges 36 and 58 and the pivot bolt 90, is continuously aligned with the friction surface 64 as the snips 10 are moved between the open and closed position. Further, it is to be understood that the raised friction surface 64 will be located to the rear or pivot bolt 90 when the support neck 28 is intermediate the upper blade 50 and the first cutting edge 36; and it will be located forward of the pivot bolt 90 when the upper blade 50 is intermediate the support neck 28 and the first cutting edge 36 (FIGS. 7 and 9).

The upper blade 50 includes configuration bends 66 and 68 which allow the alignment of the cutting edges 36 and 58 and the alignment of the anvil 38 and chisel edge 56 when connecting bolt 90 is in place. The upper and lower blades, 20 and 50, can be easily separated for sharpening by removal of nut 92 from bolt 90 and the removal of bolt 90 from threaded opening 51.

The elongated slot 52 of upper blade 50 has its longitudinal axis directed to a point below pivot bolt 90. This positioning increases the leverage, particularly as the blades approach the closed position and the cutting force is decreased due to increased distance from the pivot bolt 90. The sleeve bearing 74 applies progressively increasing force to the lower blade 20 as the snips 10 approach the closed position.

FIGS. 7-10 illustrate alternate embodiments of the present invention wherein shears 110 and 210 having lower cutting blades 120 and 220 and upper blades 150 and 250 are illustrated.

FIG. 7 shows shears 110 having a lower blade 120 which includes a vertical neck 128, a first horizontal section 130, a downwardly inclined intermediate section 132, a second horizontal section 134, and a handle 140 attached to the vertical neck 128. As shown most clearly in FIG. 8, the first cutting edge 136 is raised above the first horizontal section 130. A raised friction surface 164 is formed on neck 128 and is disposed forward of the pivot bolt 190. The upper blade 150, having a second cutting edge 158, is pivotally attached to the lower blade 120 by bolt 190 and nut 192. Handle 170 is attached to the rearward end of upper blade 150. The principle and operation of the stepped lower blade 120 and the raised friction surface 164 are the same as for the similar features of the snips 10 described above.

FIG. 9 shows shears 210 having a lower blade 220 which includes a vertical neck 228, a first horizontal section 230, a downwardly inclined intermediate section 232, and a second horizontal section 234. The handle 240 is attached to neck 228 by a horizontal connecting plate 227. As shown most clearly in FIG. 10, the first cutting edge 236 is raised above the first horizontal section 230. A raised friction surface 264 is formed on handle 240 and is disposed forward of the pivot bolt 290. The upper blade 250, having a second cutting edge 258, is pivotally attached to the lower blade 220 by bolt 290 and nut 292. Upper blade 250 does not require configuration bends since connecting plate 227 positions it directly above the first cutting edge 236. Handle 270 is attached to the rearward end of upper blade 250. As with shears 110, the principle and operation of shears 210 are the same as for similar features of the snips 10 described above.

Thus, it can be seen that an improved snips and shears has been provided which accomplishes all of its stated objectives.

Obviously, many modifications and variations of the present invention are possible in light of the above teachings. It is therefore to be understood that, within the scope of the appended claims, the invention may be practiced otherwise than as specifically described.

I claim:

1. A tool for cutting rigid material, said tool comprising:
   a lower sheet metal blade including a substantially horizontally disposed body and a substantially vertically disposed support neck, said body including a first horizontal section adjacent said neck and extending laterally therefrom and an intermediate section extending generally downwardly from said horizontal section and away from the plane of said neck, said intermediate section also extending forwardly of said neck with the side edge adjacent the plane of said neck being spaced from said plane of said neck, said side edge of said intermediate section forming a first cutting edge;

an upper sheet metal blade including a second cutting edge along its side adjacent said connecting neck of said lower blade, said blades being relatively movable between a first position in which said second cutting edge is disposed in a closed mating position with said first cutting edge and a second position in which said cutting edges are spaced apart;

means pivotally connecting said upper blade to said support neck for pivotal movement between said first and second positions; and first and second handles respectively connected to said lower and upper blades at the ends spaced from said cutting edges for moving said blade relative to each other between said first and second positions, said upper blade including an elongated slot, and said second handle being slidably and pivotably attached to said upper blade, and pivotably attached to said lower blade.

2. The tool of claim 1, wherein said pivotal attachment of the second handle to the lower blade is at a point adjacent to the forward end of said first handle, whereby greater leverage is obtained since the distance from the point of pivotal attachment of the second handle to the lower blade, to the point of pivotal connection of the upper blade structure to the support neck is maximized.

3. The tool of claim 1, wherein the longitudinal axis of said elongated slot is directed to a point below the point of pivotal connection of the upper blade to the support neck, whereby increased leverage is obtained.

4. The tool of claim 1, wherein said second handle is slidably and pivotally attached to said upper blade by a rivet including a shaft, and a sleeve bearing disposed around said shaft, said sleeve bearing being disposed to engage the interior of said elongated slot.

5. A tool for cutting rigid material, said tool comprising:

a lower sheet metal blade including a support neck and a body having a first cutting edge extending from a point below to a point above the line of juncture of said neck and said body;

an upper blade including a second edge;

means pivotably connecting said upper blade to said support neck for movement between a first position in which said second cutting edge is disposed in a closed mating position with said first cutting edge and a second position in which said cutting edges are spaced apart;

first and second handles respectively connected to said lower and upper blades at the ends spaced from said cutting edges for moving said blades relative to each other between said first and second positions;

said upper blade including an elongated slot, said second handle being slidably and pivotably attached to said upper blade and pivotably attached to said lower blade.

6. The tool of claim 5, further including a raised friction surface formed on one of said blades and disposed intermediate said blades at a point remote from the pivotal connection.

7. The tool of claim 5, further including a downwardly extending heel disposed at the rearward end of said second cutting edge.

8. The tool of claim 5, wherein said support neck is offset to one side of said first cutting edge.

9. The tool of claim 5, further including a gusset disposed at the junction of said body and said support neck of said lower blade.

10. The tool of claim 5, wherein said second cutting edge is curved.

11. The tool of claim 5, wherein said second cutting edge includes a narrow land extending adjacent thereto.

12. The tool of claim 5, wherein said each of lower blade and said upper blade includes a wire cutting surface disposed such that the wire cutting surfaces are in a closed mating position when the first cutting edge and the second cutting edge are in the closed position.

13. The tool of claim 5, wherein said pivotal connecting means includes a lock nut and bolt, whereby the bolt can be removed providing easy access for sharpening the blades.

14. The tool of claim 5, wherein said pivotal attachment of the second handle to the lower blade is at a point adjacent to the forward end of said first handle, whereby greater leverage is obtained since the distance from the point of pivotal attachment of the second handle to the lower blade, to the point of pivotal connection of the upper blade to the support neck is maximized.

15. The tool of claim 5, wherein the longitudinal axis of said elongated slot is directed to a point below the point of pivotal connection of the upper blade to the support neck, whereby increased leverage is obtained.

16. The tool of claim 5, wherein said second handle is slideably and pivotally attached to said upper blade by a rivet including a shaft, and a sleeve bearing disposed around said shaft, said sleeve bearing being disposed to engage the interior of said elongated slot.

17. A tool for cutting rigid material, said tool comprising:

a lower sheet metal blade including a support neck and a body having a first cutting edge extending from a point below to a point above the line of juncture of said neck and said body;

an upper blade including a second edge;

means pivotably connecting said upper blade to said support neck for movement between a first position in which said second cutting edge is disposed in a closed mating position with said first cutting edge and a second position in which said cutting edges are spaced apart;

first and second handles respectively connected to said lower and upper blades at the ends spaced from said cutting edges for moving said blades relative to each other between said first and second positions;

a raised friction surface formed on one of said blades and disposed intermediate said blades at a point remote from the pivotal connection;

said upper blade including an elongated slot, said second handle being slidably and pivotably attached to said upper blade, and pivotably attached to said lower blade.

18. The tool of claim 17 wherein a lower sheet metal blade includes a substantially horizontally disposed body and a substantially vertically disposed neck, said body including a first horizontal section adjacent said neck and extending laterally therefrom and an intermediate section extending generally downwardly from said horizontal section and away from the plane of said neck, said intermediate section also extending forwardly of said neck with the side edge adjacent the plane of said neck being spaced from said plane of said neck, said side edge of said intermediate section forming a first cutting edge; and wherein said lower blade includes said second cutting edge extending along its side adjacent said neck of said lower blade.

19. The tool of claim 18, wherein said body further includes a second horizontal section disposed at the side edge of said intermediate section opposite from said cutting edge.

20. The tool of claim 18, wherein said first cutting edge is disposed to extend above said first horizontal section.

21. The tool of claim 18, further including a downwardly extending heel disposed at the rearward end of said second cutting edge.

22. The tool of claim 18, further including a gusset disposed at the junction of said body and said support neck of said lower blade.

23. The tool of claim 17, wherein said second cutting edge is curved.

24. The tool of claim 17, wherein said second cutting edge includes a narrow land.

25. The tool of claim 17, wherein said lower blade structure and said upper blade structure include a wire cutting surface disposed such that the wire cutting surfaces are in a closed mating position when the first cutting edge and the second cutting edge are in the closed position.

26. The tool of claim 17, wherein said pivotal connecting means includes a lock nut and bolt, whereby the bolt can be removed providing easy access for sharpening the blades.

27. The tool of claim 17, wherein said pivotal attachment of the second handle to the lower blade is at a point adjacent to the forward end of said first handle, whereby greater leverage is obtained since the distance from the point of pivotal attachment of the second handle to the lower blade, to the point of pivotal connection of the upper blade to the support neck is maximized.

28. The tool of claim 17, wherein the longitudinal axis of said elongated slot is directed to a point below the point of pivotal connection of the upper blade to the support neck, whereby increased leverage is obtained.

29. The tool of claim 17, wherein said second handle is slidably and pivotally attached to said upper blade by a rivet including a shaft, and a sleeve bearing disposed around said shaft, said sleeve bearing being disposed to engage the interior of said elongated slot.

30. A tool for cutting rigid material, said tool comprising:
a lower sheet metal blade including a support neck and a body having a first cutting edge extending from a point below to a point above the line of juncture of said neck and said body;
an upper blade including a second edge;
means pivotably connecting said upper blade to said support neck for movement between a first position in which said second cutting edge is disposed in a closed mating position with said first cutting edge and a second position in which said cutting edges are spaced apart;
first and second handles respectively connected to said lower and upper blades at the ends spaced from said cutting edges for moving said blades relative to each other between said first and second positions;
a downwardly extending heel on said upper blade disposed at the rearward end of said second cutting edge; and
said upper blade including an elongated slot, said second handle being slidably and pivotably attached to said upper blade, and pivotably attached to said lower blade.

31. The tool of claim 30, wherein said pivotal attachment of the second handle to the lower blade is at a point adjacent to the forward end of said first handle, whereby greater leverage is obtained since the distance from the point of pivotal attachment of the second handle to the lower blade, to the point of pivotal connection of the upper blade to the support neck is maximized.

32. The tool of claim 30, wherein the longitudinal axis of said elongated slot is directed to a point below the point of pivotal connection of the upper blade to the support neck, whereby increased leverage is obtained.

33. The tool of claim 30, wherein said second handle is slidably and pivotally attached to said upper blade by a rivet including a shaft, and a sleeve bearing disposed around said shaft, said sleeve bearing being disposed to engage the interior of said elongated slot.

* * * * *